Jan. 7, 1941.  L. C. WEATHERS  2,227,474
ELECTRIC MOTOR
Filed Aug. 11, 1939   2 Sheets-Sheet 1

Inventor
Leland Clay Weathers
By Bacon & Thomas
Attorneys

Jan. 7, 1941.    L. C. WEATHERS    2,227,474
ELECTRIC MOTOR
Filed Aug. 11, 1939    2 Sheets-Sheet 2

Inventor
Leland Clay Weathers
By Bacon + Thomas
Attorneys

Patented Jan. 7, 1941

2,227,474

UNITED STATES PATENT OFFICE 2,227,474

ELECTRIC MOTOR

Leland C. Weathers, Falls Church, Va., assignor to Dawson J. Burns, New York, N. Y.

Application August 11, 1939, Serial No. 289,667

11 Claims. (Cl. 172—239)

This invention relates to electric motors, and more particularly to electric motors of the self-synchronous type.

Motors of the self-synchronous type, that is to say, motors of the synchronous type having alternating current excitation so that interconnected motors stay in step at low speeds or even at standstill position, are relatively unstable in that they tend to "hunt," drop out of step, and then "spin" by running as single phase induction motors. Mechanical dampers have been conventionally employed to overcome this instability, but such dampers substantially increase the frictional resistance to turning of the rotors of the machines and decrease the accuracy of the machines.

As disclosed in my copending application Serial No. 220,542, filed July 21, 1938, of which the present application is a continuation in part, hunting or spinning of the rotors of the various machines can be prevented by connecting a quadrature circuit to an exciting winding, which quadrature circuit has substantially the same impedance as the main exciting circuit. Both circuits may be employed for excitation purposes by using a dual excitation transformer disclosed in the above mentioned application, or the quadrature circuit may include an external impedance substantially similar to the impedance of the source of alternating current employed for excitation.

The synchronizing torque of machines of self-synchronous systems decreases as the machines approach the synchronous speed of the field set up by the alternating current excitation. At such synchronous speed the synchronizing torque becomes zero. In order to maintain the machines in step at such high speeds, it has been proposed to apply direct current energization as well as alternating current excitation, so that the machines become, in fact, synchronous alternators and motors at high speeds.

The present invention is directed to the application of direct current excitation to machines which are stabilized by equal impedance quadrature circuits connected to the exciting windings. This may be accomplished either in machines involving dual alternating current excitation or in machines having single alternating current excitation and a quadrature impedance circuit balancing the impedance of the exciting circuit.

It is, therefore, an object of the present invention to provide an improved self-synchronous system in which both direct current excitation and alternating current excitation are employed and in which the machines are stabilized against hunting or spinning.

Another object of the invention is to provide a self-synchronous system in which the field windings are excited dually both by alternating current and direct current.

A further object of the invention is to provide a self-synchronous sysem in which combined direct current and alternating current excitation is produced by rectifying the alternating current employed to excite the machines.

A still further object of the invention is to provide a self-synchronous system in which three wire machines are employed with other machines having both direct current and alternating current excitation in order to prevent loss of synchronizing torque at high speeds in a combination wherein the machines are stabilized against hunting and spinning.

Other objects and advantages of the invention will appear in the following description of preferred embodiments of the invention shown in the attached drawings, in which.

Figure 1:
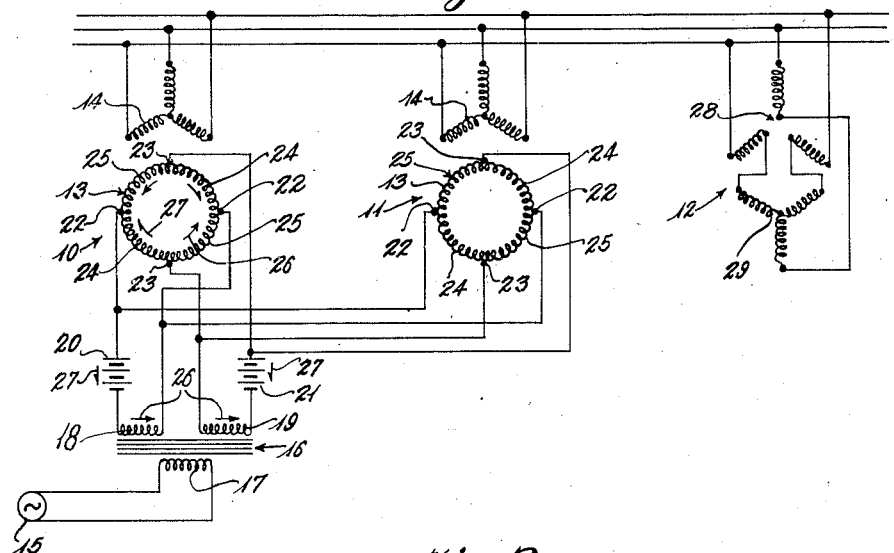
Figure 1 is a schematic diagram of a self-synchronous system.

Referring to Figure 1, 10 indicates a self-synchronous machine excited with both direct and alternating current, 11 indicates a self-synchronous machine of the same type as 10, connected in parallel with the machine 10, and 12 indicates a three wire series connected machine arranged for synchronous operation with machines 10 and 11. The machines 10 and 11 each include primary or field windings 13 and phase wound secondary windings 14. These machines are excited from a main alternating current source 15 through a dual excitation transformer 16 provided with a primary winding 17 and separate secondary windings 18 and 19, the latter windings constituting electrically independent sources of alternating current. The transformer secondary winding 18 is connected across diametrically opposed points 22 of each of the primary windings 13 of the machines 10 and 11 in series with a direct current source 20. The secondary winding 19 of the transformer 16 is likewise connected across diametrically opposed points 23 of each of the primary windings 13 of the machines, in series with a direct current source 21. The points of connection 22 of the current sources 18 and 20 to the primary windings 13 of the machines are displaced 90 electrical degrees from the points of connection 23 of the current sources 19 and 21 to the primary windings 13. The primary windings 13 of the machines 10 and 11 are thus divided into opposed quadrants 24 and opposed quadrants 25. If the secondary windings of the transformer 16 are so connected that an instantaneous value of the voltage produced in the secondaries is that shown by the full arrows 26, it will be found that the alternating current voltages from the sources 18 and 19 will oppose each other in the quadrants 24 but add in the quadrants 25 so that alternating current flows through the quadrants 25 but does not flow through the quadrants 24. This condition holds throughout the alternating current cycle. It will be further noted that the magneto motive forces from the direct currents flowing through the transformer secondary windings 18 and 19 oppose each other so that no substantial direct current flux is produced in the transformer iron.

Also, if the direct current voltages of the sources 20 and 21 are in the direction shown by the half arrows 27, it will be found that the direct current voltages oppose in the quadrants 25 but add in the quadrants 24, so that direct current flows through the quadrants 24 but does not flow through the quadrants 25. It will thus be seen that the direct current field set up will be at right angles to the oscillating field set up by the alternating current energization. This is a desirable condition, as the direct current flux threads different portions of the iron from that of the alternating current flux and more flux can be produced in the motors without causing excessive saturation. The arrangement shown with respect to the motors 10 and 11 of Figure 1 produces balanced quadrature circuits having the same impedance therein if the direct current sources 20 and 21 are of the same type and the transformer secondaries 18 and 19 are similar. As explained in the copending application above referred to, such a connection provides a path for currents which are of proper phase to damp oscillating fields in the motor which are at right angles to the main alternating current oscillating field. The right angle or quadrature oscillating field causes the hunting or oscillations above referred to, and balanced low impedance paths effectively damp out such fields and stabilize the operation of the machines. At low speeds or at standstill, the synchronizing torque between the machines is provided by the alternating current oscillating field and at high speeds the synchronizing torque is provided by the direct current field.

The three wire machine 12 is shown connected to the machines 10 and 11 to illustrate that three wire machines may also be employed in conjunction with machines having both direct current and alternating current excitation. The machine 12 is shown as a series connected three wire machine having first phase wound windings 28 upon one member of the machine, which windings are connected in series with second phase wound windings 29 upon the other member of the machine. The rotor of this machine is held in step with the rotors of the machines 10 and 11 at low speeds by fields set up by currents flowing through the windings 28 and 29 due to voltages induced in the windings 14 of either or both of the machines 10 or 11 by the single phase alternating current field produced by alternating current excitation of the windings 13. At high speeds the alternating currents caused to flow in the windings 28 and 29 of the machine 12 by voltages induced in the windings 14 of the machines 10 and 11 from the direct current field therein hold the machine 12 in step. The machine 12 rotates at twice the speed of the machine 10 or 11, and in fact becomes a series connected synchronous motor.

It is apparent that any of the machines 10, 11 or 12 can be employed as a transmitter with the other machines as receivers, if the transmitter is of sufficient size to furnish power to the other machines. This is true even where the machine 12 is employed as the transmitter at high speeds, as the voltages induced by the direct current field in the secondary windings of either the machine 10 or 11 cause synchronizing currents to flow between the machines even at the synchronous speed of the alternating current field in the machines 10 and 11.

With somewhat less effect, two separate field windings can be employed instead of the single closed field windings of the machines 10 and 11. Such an arrangement is shown in the machine 30 of Figure 2 which is provided with separate field windings 31 and 32, each of which is separately energized with both alternating and direct current. For example, the windings 31 may be connected in series with a direct current source 33 and an alternating current source 34 which may be one secondary of a dual excitation transformer 35. The other field windings 32 may be connected in series with a direct current source 36, and the other secondary 37 of the transformer 35. The transformer 35 is provided with a primary 38 connected to an alternator 39. In this arrangement, all of the conductors of the windings 31 and 32 carry both alternating and direct current.

As in the case of Figure 1, the magnetomotive forces set up by the direct current in the transformer 35 can be arranged to oppose each other so as to prevent over-saturation of the iron thereof. With the arrangement shown in Figure 2, the resulting oscillating field set up by the alternating current is at right angles to the resulting direct current field, so that more uniform distribution of the flux in the iron of the machines is produced.

The machine 30 is also provided with phase wound secondary windings 40 interconnected with similar phase wound windings 41 upon one member of other self-synchronous machines, for example the machines 42 and 43. The machine 42 is shown as being provided with closed field windings 44 upon its other member. The field windings 44 may be directly energized from the alternator 39 through conductors 46 and 47. Instead of energizing the windings 44 dually from the alternating current source as in the machines 10, 11 and 30, a quadrature impedance circuit including a direct current source 48 and an external impedance 49 in series therewith may be employed for producing a direct current field in the machine and providing balanced impedance circuits for the prevention of hunting or spinning. The circuit including the direct current source 48 and impedance 49 is preferably connected with the field windings 44 in quadrature with the conductors 46 and 47 leading to the alternator 39. In this case also, an alternating current field is set up at right angles to a direct current field and all of the conductors of the field windings carry both alternating and direct current. By making the combined impedance of the impedance 49 and direct current source 48 substantially equal in amount and kind to that of the external circuit including the alternator 39, oscillating fields in quadrature to the main alternating current field are substantially completely damped out to prevent hunting or spinning. This arrangement is also not as effective as that shown with respect to the motors 10 and 11 of Figure 1, as it may be difficult to maintain a balance between the impedances of the quadrature circuits.

Figure 2:
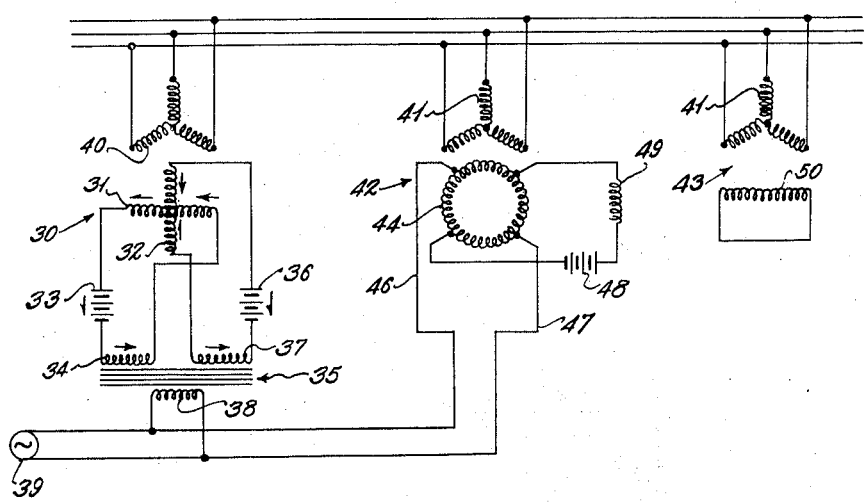
Figure 2 is a similar diagram of a modified self-synchronized system.

It is apparent that the two separate windings of the machine 30 can be substituted for the single closed windings of the machine 42 by connecting the alternator 39 directly across one of the windings and the direct current source 48 and impedance 49 in series with the other of the windings, although this arrangement is not as effective as either that shown with respect to the machines 10 and 11 of Figure 1 or the machines 30 and 42 of Figure 2.

The machine 43 is a modified type of three wire machine in which a short circuited winding 50 is employed on one member for reaction with the phase wound windings 41 on the other member. As in the case of Figure 1, any of the machines of Figure 2 may be employed as the transmitter or as a receiver, and any of the machines of Figure 2 may be employed in conjunction with any of the machines of Figure 1 so long as one of the machines of the system is excited; that is to say, two three wire machines will not maintain step with each other, as no excitation is present. By employing dual excitation or otherwise balancing the impedance of quadrature circuits connected to the field windings in machines receiving alternating current excitation, the system is stabilized, and hunting or spinning of any of the machines, including the three wire machines, is prevented. In some instances it is necessary to apply dual excitation or balanced impedance quadrature circuits to only some of the machines receiving alternating current excitation, as stabilizing one such machine will tend to stabilize the system.

Figure 3:
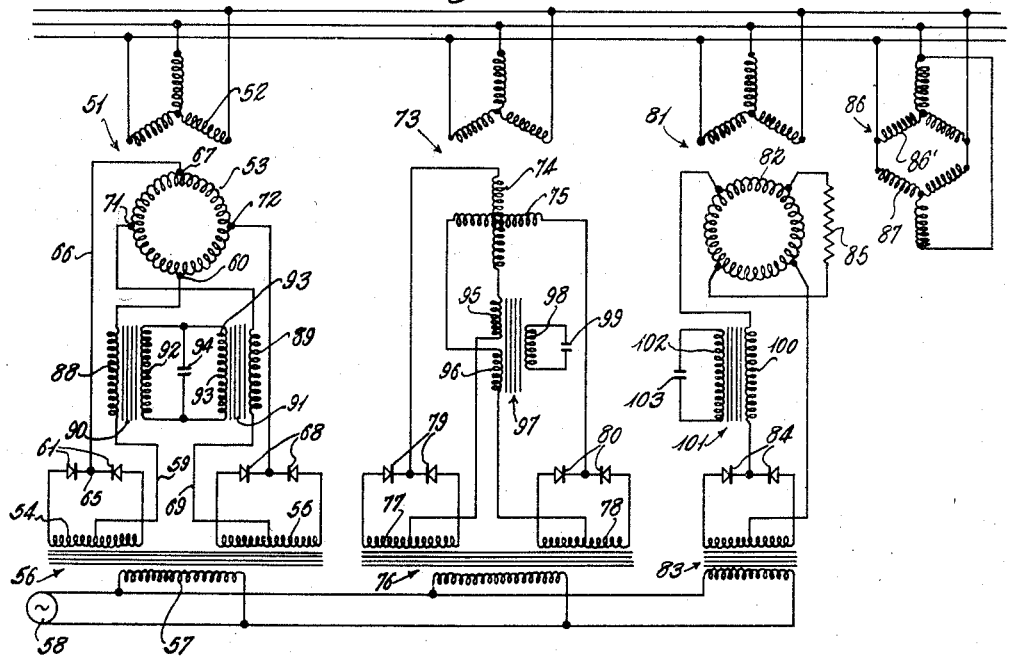
Figure 3 is a similar diagram of a further modified system employing rectification to produce simultaneous alternating and direct current excitation of certain of the machines.

Referring to Figure 3, the machine 51 thereof is arranged to have both direct current and alternating current excitation by employing rectifiers in the alternating current circuits. The machine 51 includes phase wound windings 52 upon one member and closed field windings 53 upon the other member. The field windings 53 are energized from two secondary windings 54 and 55 of a dual excitation transformer 56 having a primary 57 connected to an alternator 58. The secondary transformer winding 54 has a center tap connected by a conductor 59 to the field windings 53 at 60. Half wave rectifiers 61 are connected to the end terminals of the transformer secondary winding 54 and have their other terminals connected together at 65 and through a conductor 66 to the field windings 53 at 67. This provides full wave rectification of the current flowing through conductor 66, field windings 53 and conductor 59. This excites the field windings 53 with direct current having superimposed thereon an alternating current of twice the frequency of the current in the primary winding 57. Thus both an alternating current oscillating field and direct current field will be set up in the field windings 53 by currents from the transformer winding 54 and rectifier 61. The similar transformer winding 55 may also be provided with rectifiers 68 and be connected by conductors 69 and 70 to the field windings 53 at 71 and 72, respectively. Two quadrature circuits, both furnishing alternating current and direct current excitation and having substantially the same impedance are thereby provided.

The machine 51 may be employed as a transmitter or a receiver in a system with other machines excited with the same frequency alternating current and direct current such as the machine 73 of Figure 3. This machine may be similar to the machine 51, except that separate field windings 74 and 75 are employed. These windings may be energized through a dual transformer 76 provided with secondaries 77 and 78 and rectifiers 79 and 80. The machines 51 and 73 may also be employed in combination with a machine 81 having field windings 82 excited with both direct current and alternating current from a transformer 83 provided with rectifiers 84, the field windings being provided with a quadrature circuit having an external impedance 85 which has substantially the same impedance for alternating current as the source including the transformer 83. It is apparent that the field windings 82 might also comprise two separate quadrature windings connected to the transformer 83 and the impedance 85, respectively.

A somewhat different type of three wire machine 86 is also shown interconnected with the machines 51, 73 and 81 of Figure 3. This machine includes first phase wound windings 86' upon one member connected to second phase wound windings 87 upon the other member, the windings 86' and 87 being connected in parallel. Any of the three wire machines 12 of Figure 1, 43 of Figure 2 or 86 of Figure 3 can be employed in any of the systems of Figures 1 to 3.

Since the field excitation circuits of the machines 51, 73 and 81 of Figure 3 are inductive, it is desirable in some cases to provide series capacitance in these circuits so as to reduce the impedance to the double frequency or second harmonic current flowing therein. By employing sufficient capacitance to bring these circuits to series resonance, for the second harmonic the impedance therefore may be reduced to the resistance of the circuit and the second harmonic alternating component of the current made a maximum. This can be accomplished by inserting transformer primaries 88 and 89 of transformers 90 and 91, respectively, in the conductors 59 and 69, respectively, connected to the field windings of the machine 51. The secondaries 92 and 93 of the transformers may be connected to a common condenser 94. This condenser may be made of relatively small capacity by employing the transformers 90 and 91 to step up the alternating current voltage across the primaries 88 and 89. Substantially the same thing can be accomplished, as shown with respect to the machine 73, by inserting two primaries 95 and 96 of the same transformer 97 in the two excitation circuits and connecting the secondary 98 of the transformer 97 to a condenser 99. It is apparent that separate condensers may be connected to each of the transformer secondaries 92 and 93 of the circuit of the machine 51 so as to produce no mutual coupling between the two quadrature circuits. Also, a transformer primary 100 of the transformer 101 may be connected in series with the field excitation circuit of the machine 81.

By connecting the secondary 102 of the transformer 101 to a condenser 103 of suitable capacity, the impedance of this circuit for the second harmonic may be made substantially equal to the resistance of the circuit. Sufficient iron should be employed in the transformers 90, 97 and 101 so that the direct current component of the current through their primaries does not cause excessive saturation thereof.

In the machines of Figure 3, the alternating current field and direct current field are parallel instead of being at right angles to each other as is the case of the machines of Figures 1 and 2, so that the flux distribution in the iron of these machines is not as good as that of the machines of Figures 1 and 2, but the higher frequency obtainable from the commercial sources of alternating current is a distinct advantage, in that greater synchronizing torque can be produced in a given size machine.

Figure 4:
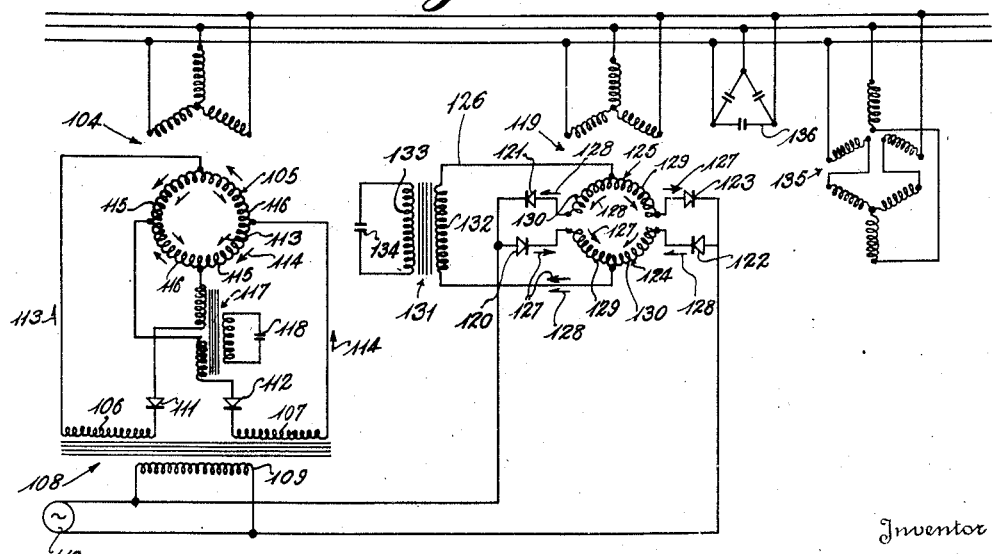
Figure 4 is a similar diagram of a further modified system also employing rectification.

The system disclosed in Figure 4 illustrates another way of obtaining both direct current and alternating current excitation of the field of self-synchronous machines by rectification of the alternating current. This system has the advantage that the alternating current and direct current fields are at right angles to each other as in the systems of Figures 1 and 2, but the alternating current field has the frequency of the applied voltage instead of twice the frequency as in Figure 3. The machine 104 of Figure 4 may have a closed field winding 105 having quadrature connections to two secondaries 106 and 107 of a dual excitation transformer 108 having a primary 109 connected to a source of alternating current 110. Half wave rectifiers 111 and 112 may be connected in series with the secondaries 106 and 107, respectively, so that current flows through these secondaries alternatively, i. e. current flows through the secondary 106 for one-half cycle and through the secondary 107 for the next half cycle, etc. If the current through the secondary 106 and field winding 105 is represented by the half arrows 113 and the current through the secondary 107 and field winding is represented by the full arrows 114, it will be noted that the current through the quadrants 115 is always in the same direction to produce a direct current field along one axis while the current in the quadrants 116 reverses for each half cycle to produce an alternating current field in a quadrature axis. If desired, another transformer 117 having separate secondaries in series with the two quadrature circuits may be employed to impress a relatively high voltage across a condenser 118. By employing a condenser 118 of suitable size, the impedance of the excitation circuits for the alternating currents may be reduced to substantially the resistance of the circuits to make the alternating current component substantially a maximum. By correctly connecting the secondaries of the transformer 117 in the quadrature circuits, currents of the same frequency as the source flow in the secondary of the transformer 117 and the condenser 118. As the rectifiers 106 and 107 prevent currents in the quadrature circuits from reversing, there is in fact no mutual coupling between these circuits by the transformer 117 and the condenser 118.

By reversing the connection to one of the primaries of the transformer 117, the current flowing in the secondary and condenser 118 is primarily the second harmonic of the frequency of the source. Also, there is effective mutual coupling between the quadrature circuits so that full wave rectified current flows in both quadrature circuits. This is true even if the secondary of the transformer 117 along with the condenser 118 is omitted. However, a condenser of suitable size reduces the impedance to the second harmonic produced by rectification so as to increase the magnitude of this alternating current component. With the connection under discussion both alternating current of double frequency and direct current flows in both quadrature circuits. The resulting fields set up in the field windings 105 are an alternating current field of double frequency in alignment with a direct current field. Thus the machine is of the same general type as the machines 51, 73 and 81 disclosed in Figure 3 and may be employed in the system of Figure 3 but not in the systems of Figures 1, 2 and 4.

The machine 119 of Figure 4 requires no dual excitation transformer but may be energized directly from the source 110 through half wave rectifiers 120, 121, 122 and 123. The field winding of this machine is divided into two halves 124 and 125. The ends of the half winding 124 are connected to the rectifiers 120 and 122 and the ends of the half winding 125 are connected to the rectifiers 121 and 123. Since the rectifier 120 opposes the rectifier 122 and the rectifier 121 opposes the rectifier 123, any current flowing through the windings must also flow through an external circuit 126 connected across the mid points of the half windings 124 and 125. If the current through the rectifiers 120 and 123 and the field windings and external circuit 126 is represented by the full arrows 127 and the current through the rectifiers 122 and 121 and the field windings and external circuit 126 is represented by the half arrows 128, it will be noted that current flows through the quadrants 129 of the field winding during one half cycle and through the quadrants 130 during the other half cycle. It will be noted that current always flows in the same direction through the external circuit 126 so that direct current energization is accomplished in one axis while alternating current excitation is produced in the quadrature axis. The result is a direct current field in one axis and an alternating field of the same frequency as the source in the quadrature axis. The same type of fields is set up in both the machines 104 and 119, so that these machines may be operated in the same system. As a large component of second harmonic current is present in the external circuit 126 and the field winding, a transformer 131 having its primary 132 in series with the circuit 126 and its secondary 133 connected to any desired impedance device such as a condenser 134 may be employed to adjust the impedance of the machine for this component. By employing a condenser of suitable size, the alternating current impedance of the machine may be reduced substantially to the resistance thereof so as to make the alternating current component a maximum. It will be noted that current flows through both the machines 104 and 119 during both half cycles so that the rectifier circuits do not cause uneven current flow from the source 110.

The machines 104 and 119 may also be employed in a system along with a three wire machine 135 which is shown as being series connected but which may be any of the types disclosed herein. In many cases it is desirable to employ a condenser bank 136 connected in parallel with the interconnected phase wound windings of the various machines in order to correct the power factor of the currents in the phase wound windings. This is particularly true when three wire machines are employed in the system and such a condenser bank may be also employed in the systems of any of Figures 1, 2 and 3. It will be noted that all of the systems illustrated contain balanced impedance quadrature circuits connected to the field windings so that hunting and spinning is prevented.

While I have described the preferred embodiments of my invention, it is to be understood that the details thereof may be varied within the scope of the appended claims.

I claim:

1. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines at least one of said machines having field windings upon the other member thereof, means for exciting said field windings with alternating current and direct current, said means including two alternating current and two direct current sources and two circuits each including one of said alternating current sources and one of said direct current sources and having substantially the same impedance connected in quadrature to said field windings, the other members of the other of said machines being provided with means acting with the synchronizing field of said other of said machines to provide a torque tending to maintain corresponding angles between the relatively rotatable members of said machines.

2. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines, at least one of said machines having field windings upon the other member thereof, said field windings forming a closed circuit, means for exciting said field windings with alternating current and direct current, said means including two alternating current and two direct current sources and two circuits each including one of said alternating current sources and one of said direct current sources and having substantially the same impedance connected in quadrature to said field windings, the other members of the other of said machines being provided with means acting with the synchronizing field of said other of said machines to provide a torque tending to maintain corresponding angles between the relatively rotatable members of said machines.

3. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines, at least one of said machines having field windings upon the other member thereof, means for exciting said field windings with alternating current and direct current, said means including a first circuit having a source of direct current and a source of alternating current connected in series to said field windings and a second circuit having substantially the same impedance as said first circuit connected to said field windings in quadrature with said first circuit, the other members of the other of said machines being provided with means acting with the synchronizing field of said other of said machines to provide a torque tending to maintain corresponding angles between the relatively rotatable members of said machines.

4. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines, at least one of said machines having field windings upon the other member thereof, means for exciting said field windings with alternating current and direct current, said means comprising two independent circuits each having a source of alternating current and a source of direct current in series therewith, said independent circuits being connected to said field windings in quadrature with each other, the other members of the other of said machines being provided with means acting with the synchronizing field of said other of said machines to provide a torque tending to maintain corresponding angles between the relatively rotatable members of said machines.

5. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines, at least one of said machines having field windings upon the other member thereof, means for exciting said field windings with alternating current and direct current, said means comprising a first circuit having a source of alternating current in series therewith connected to said field windings and a second circuit having a source of direct current and an impedance in series therewith connected to said field windings in quadrature with said first circuit, said first and second circuits having substantially the same impedance, the other members of the other of said machines being provided with means acting with the synchronizing field of said other of said machines to provide a torque tending to maintain corresponding angles between the relatively rotatable members of said machines.

6. A system as defined in claim 4 in which the direct current sources of power are rectifiers in series with said alternating current sources of power.

7. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines, at least one of said machines having field windings upon the other member thereof, means for exciting said field windings with alternating current and direct current, said means including a first circuit containing a source of direct current and a source of alternating current in series therewith connected to said field windings and a second cicuit having an external impedance therein, said first and second circuits having substantially the same impedance, the other members of the other of said machines being provided with means acting with the synchronizing field of said other of said machines to provide a torque tending to maintain corresponding angles between the relatively rotatable members of said machines.

8. A system as defined in claim 7 in which the direct current source is a rectifier in series with said alternating current source.

9. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines, at least one of said machines having field windings upon the other member thereof, means for exciting said field windings with alternating current and direct current, said means comprising an exciting circuit connected to said field windings and including a source of alternating current, rectifying means in series with said source to provide direct current energization and alternating current energization of double the frequency of the current of said source and a capacitive reactance associated with said exciting circuit to reduce the impedance thereof for said double frequency current, the other members of the other of said machines being provided with means acting with the synchronizing field of said other of said machines to provide a torque tending to maintain corresponding angles between the relatively rotatable members of said machines.

10. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines, at least one of said machines having field windings upon the other member thereof, means for exciting said field windings with alternating current and direct current, said means comprising a pair of exciting circuits connected to said field windings in quadrature with each other and each including a source of alternating current and a rectifier in series therewith to provide direct current excitation and alternating curent excitation of double the frequency of the current of said source, and means coupled with both said exciting circuits to minimize the impedance of said exciting circuits for said double frequency current, the other members of the other of said machines being provided with means acting with the synchronizing field of said other of said machines to provide a torque tending to maintain corresponding angles between the relatively rotatable members of said machines.

11. In combination, in a self-synchronous system, a plurality of dynamoelectric machines having relatively rotatable members with phase wound windings upon at least one member of each machine, said phase wound windings being interconnected with each other to provide for the flow of synchronizing currents between and through said windings to provide synchronizing fields in said machines, at least one of said machines having a pair of field windings upon the other member thereof, means for exciting said field windings with alternating current and direct current, said means comprising a source of single phase alternating current having one terminal thereof connected to one terminal of each of said field windings through separate half wave rectifiers and the other terminal thereof connected to the other terminals of said field windings through similar rectifiers, said field windings having a connection between their mid points and said rectifiers being connected to cause current to flow from said source into one of said field windings, through said connection, and from the other field winding to said source, the other members of the other of said machines being provided with means acting with the synchronizing field of said other of said machines to provide a torque tending to maintain corresponding angles between the relatively rotatable members of said machines.

LELAND C. WEATHERS.